(12) United States Patent
Bernica et al.

(10) Patent No.: US 9,353,683 B2
(45) Date of Patent: May 31, 2016

(54) METHOD FOR STORING COMPRESSED AIR IN POROUS SUBSURFACE LOCATIONS

(71) Applicant: CONOCOPHILLIPS COMPANY, Houston, TX (US)

(72) Inventors: Joseph G. Bernica, Houston, TX (US); James E. Sylte, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/654,775

(22) Filed: Oct. 18, 2012

(65) Prior Publication Data

US 2013/0121767 A1    May 16, 2013

Related U.S. Application Data

(60) Provisional application No. 61/560,017, filed on Nov. 15, 2011.

(51) Int. Cl.
*B65G 5/00* (2006.01)
*F02C 6/16* (2006.01)

(52) U.S. Cl.
CPC ... *F02C 6/16* (2013.01); *B65G 5/00* (2013.01); *B65G 5/005* (2013.01); *Y02E 60/15* (2013.01); *Y02E 60/17* (2013.01)

(58) Field of Classification Search
CPC ............. B65G 5/00; Y02E 60/15; F02C 6/16
USPC ............. 405/52, 53, 59, 75; 60/398, 408, 415
See application file for complete search history.

(56) References Cited

U.S. PATENT DOCUMENTS

| | | | | | |
|---|---|---|---|---|---|
| 3,538,340 | A | * | 11/1970 | Lang | 290/52 |
| 3,939,356 | A | * | 2/1976 | Loane | 290/52 |
| 3,996,741 | A | * | 12/1976 | Herberg | 60/398 |
| 4,701,072 | A | * | 10/1987 | Berezoutzky | 405/53 |
| 5,339,905 | A | * | 8/1994 | Dowker | 166/369 |
| 7,743,609 | B1 | * | 6/2010 | Brostmeyer | 60/398 |
| 7,802,426 | B2 | | 9/2010 | Bollinger | |
| 2009/0021012 | A1 | | 1/2009 | Stull et al. | |
| 2011/0023476 | A1 | | 2/2011 | Havel | |
| 2011/0061741 | A1 | | 3/2011 | Ingersoll et al. | |
| 2013/0170910 | A1 | * | 7/2013 | Hoier et al. | 405/53 |

FOREIGN PATENT DOCUMENTS

| | | | | |
|---|---|---|---|---|
| WO | 2009146101 | | 12/2009 | |
| WO | WO 2012/001105 | * | 6/2011 | E21B 41/00 |

OTHER PUBLICATIONS

Nakhamkin, et al., "Second Generation of CAES Technology—Performance, Operations, Economics, Renewable Load Management, Green Energy." POWER-GEN International, Dec. 8-10, 2009, Las Vegas Convention Center, Las Vegas, NV (2009).
St. John, "General Compression Pumps in $17M for Fuel-free Air Energy Storage", GIGAOM, Feb. 23, 2010.
Wikipedia, "Compressed air energy storage", May 12, 2011.

* cited by examiner

*Primary Examiner* — Benjamin Fiorello
*Assistant Examiner* — Carib Oquendo
(74) *Attorney, Agent, or Firm* — Boulware & Valoir

(57) ABSTRACT

A methodology for storing compressed air in porous subterranean formations for subsequent production and use in generating electricity.

19 Claims, 7 Drawing Sheets

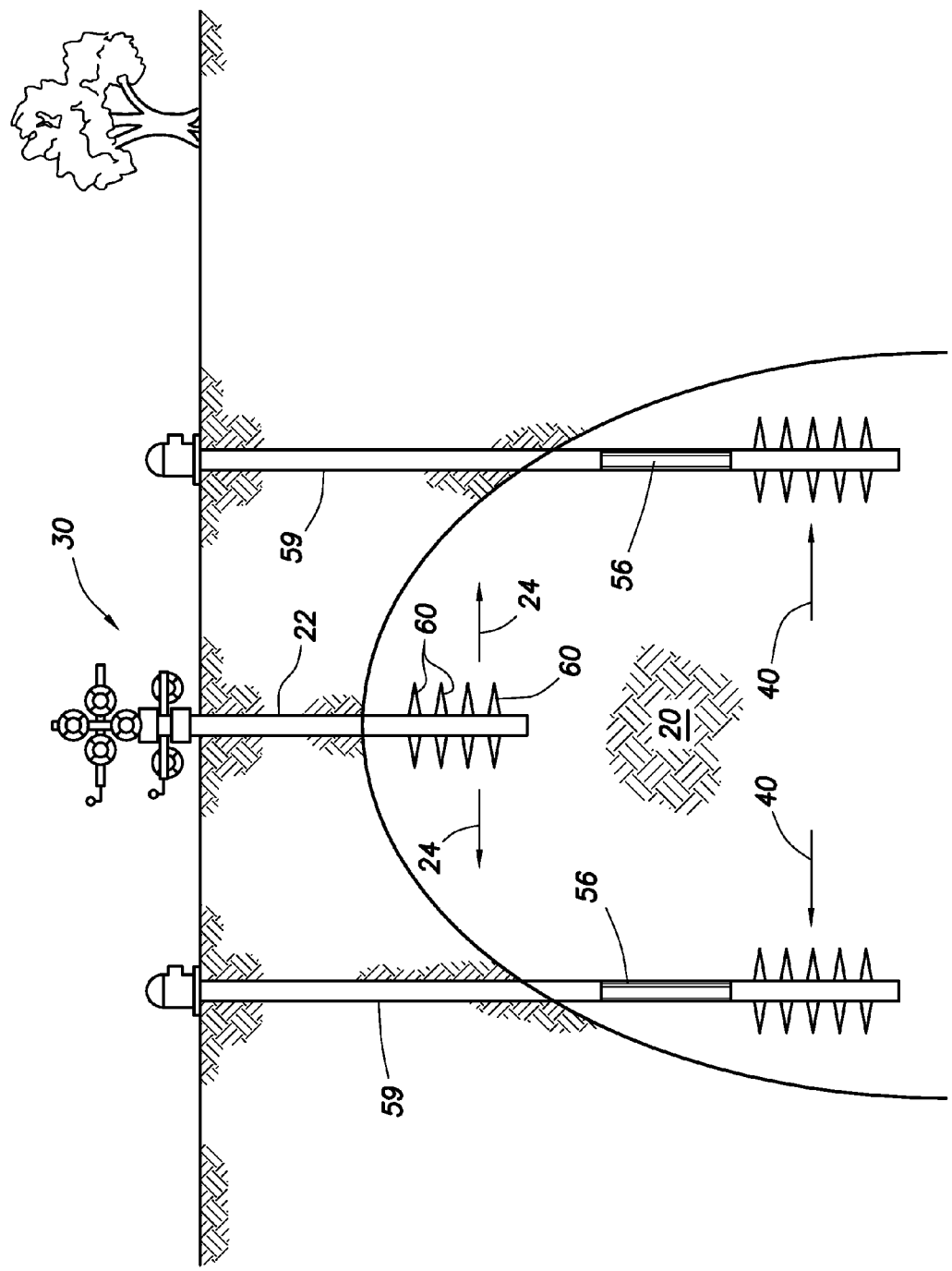

METHOD FOR STORING COMPRESSED AIR IN POROUS SUBSURFACE LOCATIONS

CROSS-REFERENCE TO RELATED APPLICATIONS

This application claims priority benefit under 35 U.S.C. Section 119(e) to U.S. Provisional Patent Ser. No. 61/560,017 filed on Nov. 15, 2011, the entire disclosure of which is incorporated herein by reference.

FIELD OF THE INVENTION

This invention relates to a methodology for storing compressed air in porous subterranean formations for subsequent production and use in generating electricity.

BACKGROUND OF THE INVENTION

Compressed Air Energy Storage (CAES) is a technique employing an available off-peak energy supply and converting it to a secondary form of energy, such as compressed air, and then employing that second form of energy during periods of peak electrical energy demand to generate electricity. In one example, off-peak electrical energy from a common commercial electrical energy grid may be used to operate an air compressor to compress air and direct the compressed air to subterranean salt caverns for storage. After a period of time, the stored, compressed air may be released from the subterranean salt cavern and be utilized to generate electricity using an electrical generator driven by release of the compressed air. One drawback of using subterranean salt caverns is that the quantity of such subterranean salt caverns is limited. Another drawback of using subterranean salt caverns is that the physical locations of such subterranean salt caverns are not always proximate a commercially available electrical energy source. Thus, a need exists for a method that will permit storage of compressed air in subterranean formations that are not open-air caverns, such as subterranean rock formations of varying porosities.

SUMMARY

In an embodiment, a process for storing compressed air in a porous subterranean formation, the process includes: without injecting air into the porous subterranean formation, pumping water from the porous subterranean formation to an earthen surface and simultaneously lowering an internal pressure of the porous subterranean formation to a first predetermined pressure; simultaneously injecting air into and pumping water from the porous subterranean formation; ramping-up air injection into the porous subterranean formation; and creating a volume of compressed air at the peak of the porous subterranean formation.

In another embodiment, a process for storing compressed air in a porous subterranean formation, in the following order, includes: pumping water from the porous subterranean formation to an earthen surface; lowering an internal pressure of the porous subterranean formation to a first predetermined pressure without injecting air into the porous subterranean formation; simultaneously injecting air into and pumping water from the porous subterranean formation; measuring the subterranean pressure of the porous subterranean formation; upon the subterranean pressure reaching the first predetermined pressure, ramping-up a rate of air injection into the porous subterranean formation; and creating a volume of compressed air at the peak of the porous subterranean formation.

In yet another embodiment, a process for storing compressed air in a porous subterranean formation, having steps in the following order, includes: placing an air injection tube at a peak of the porous subterranean formation; without injecting air into the porous subterranean formation, lowering an internal pressure of the porous subterranean formation to a first predetermined pressure by pumping water from the porous subterranean formation to an earthen surface; simultaneously injecting air into the porous subterranean formation via the air injection tube and pumping water from the porous subterranean formation; measuring the internal pressure of the porous subterranean formation; increasing an air injection rate into the porous subterranean formation upon the internal pressure reaching the first predetermined pressure; and creating and maintaining a volume of compressed air at the peak of the porous subterranean formation by cycling between injecting air into the porous subterranean formation producing air from the porous subterranean formation.

BRIEF DESCRIPTION OF THE DRAWINGS

A more complete understanding of the present invention and benefits thereof may be acquired by referring to the follow description taken in conjunction with the accompanying drawings in which:

FIG. 5 is a diagram of an air injection ramp-up arrangement of a Compressed Air Energy Storage System in accordance with the present disclosure;

DETAILED DESCRIPTION

Turning to FIGS. 1-8 a detailed description of the preferred arrangements of the present disclosure will be provided. While various embodiments are described and illustrated, the scope of the disclosure is not intended to be limited by such description and illustrations, but only by the scope of the claims that follow.

Figure 1:
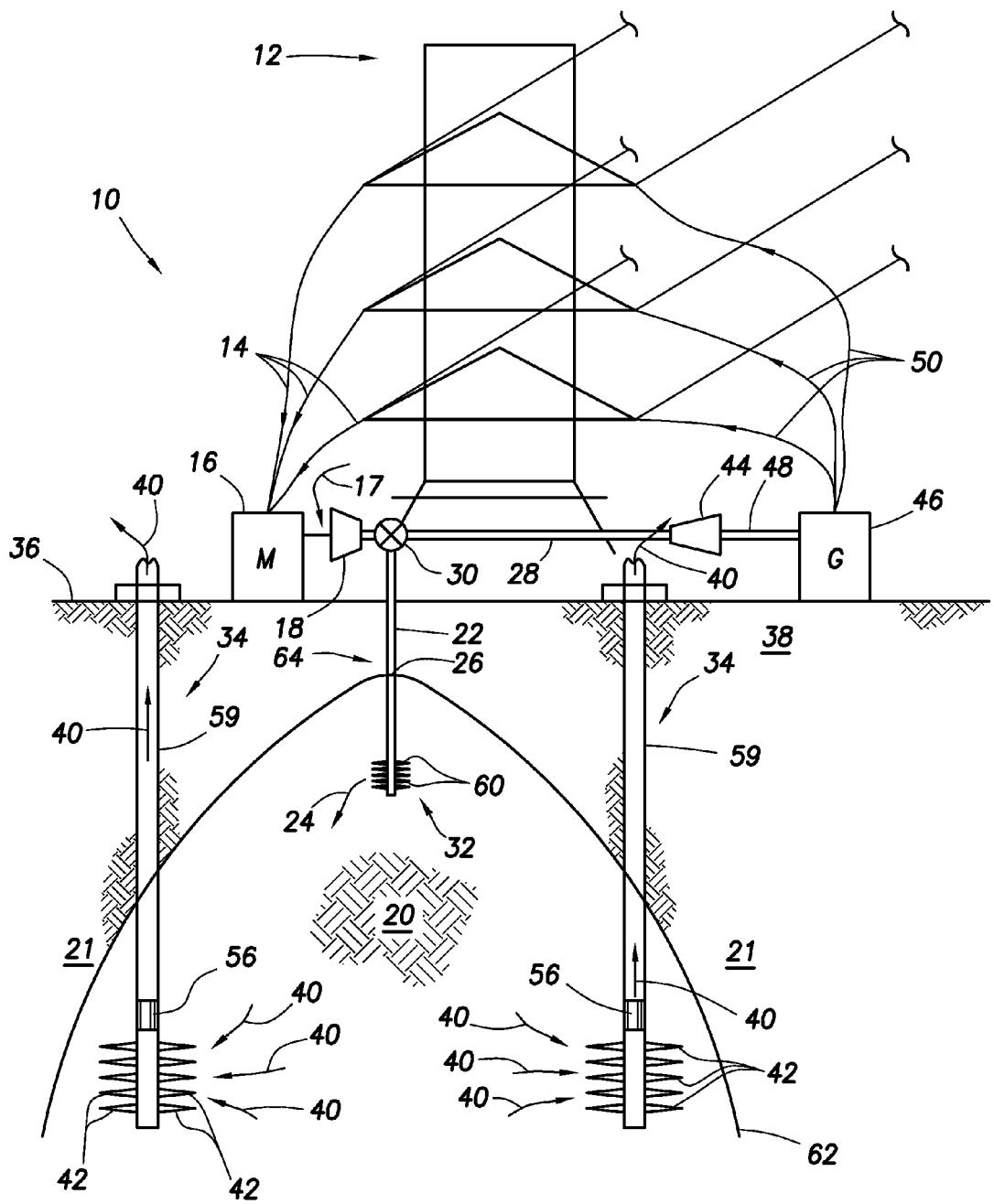
FIG. 1 is a diagram of a Compressed Air Energy Storage System in accordance with the present disclosure.

Compressed Air Energy Storage (CAES) utilizes off-peak electrical energy as a first energy form to generate and store a second energy form, which may be used at a later time to generate electrical energy when electrical energy demand is relatively high and more expensive than the cost of off-peak electrical energy. With reference to FIG. 1, a CAES system 10 may utilize an electrical power line 12 from which electrical energy may be supplied through one or more electrical down wires 14 to a motor 16. Electricity may be diverted or utilized from a power grid, which power line 12 may be part of and integrally linked. Motor 16 may utilize electricity from power line 12 to turn a shaft protruding from motor 16 to which a compressor 18 is coupled. Compressor 18 may draw in and compress ambient air 17 and inject it into a subsurface compartment 20, also known as a subterranean formation, through a subterranean pipe 22 in accordance with arrow 24. Subsurface compartment 20 or subterranean formation may not be an open cavern, such as a salt cavern, but alternatively may be a rock formation of a single or variety of porosities. The compressed air may remain in the subsurface compartment 20 until demand for electricity increases, such as when demand for electricity is near or is at a peak demand. In accordance with the present disclosure, subsurface compartment 20 may be a subterranean formation, such as a carbonate reef, sandstone, or other porous geologic formations under an impermeable or nearly impermeable material 21. Subterranean pipe 22 may be positioned through the peak or apex 26 of subsurface compartment 20; however, subterranean pipe 22 may enter at any location of subsurface compartment 20, depending upon the geological shape of subsurface compartment 20. Subterranean pipe 22 also may be used to permit compressed air within subsurface compartment 20 to flow out or (i.e. away from) subsurface compartment 20 in accordance with arrow 32 and into a transfer pipe 28. A valve 30 may be used to control flow of compressed air into and from subsurface compartment 20. While FIG. 1 depicts a single air compressor 18 and one subterranean pipe 22, more than one air compressor 18 may be part of CAES system 10, and each subterranean pipe 22 may penetrate into subsurface compartment 20 at multiple locations in subsurface compartment 20.

CAES system 10 may also be equipped with a single dewatering well 34 or more than one dewatering well 34, as depicted in FIG. 1. A dewatering well 34 may include a hollow case or tubing that extends from an earthen surface 36 through an overburden 38 and into subsurface compartment 20. Hollow case or tubing of dewatering well 34 may have perforations 42 at an end within subsurface compartment 20 to permit water 40 to enter tubing through perforations 42 to be transported up through tubing and to earthen surface 36. Water 40 that is displaced from subsurface compartment 20 provides additional space or volume for compressed air via arrow 24 to reside within subsurface compartment 20. As will be described in more detail later, upon compressed air 32 being released from subsurface compartment 20, it passes through perforations 60 in subterranean pipe 22, through valve cluster 30 and into transfer pipe 28. Compressed air then flows into turbine 44 where compressed air via arrow 32 is permitted to further decompress and expand to cause rotational motion and drive electrical generator 46 via a shaft 48 coupled to turbine 44, for example. Electrical energy generated by electrical generator 46 then may be transmitted via cables 50 to power line 12 and to the electrical grid for consumer use.

To efficiently and effectively utilize CAES system 10 depicted in FIG. 1, a method of storing compressed air in a subsurface compartment 20 occupied with a rock formation may be employed. With reference including FIG. 2, steps in a method of storing compressed air in a subsurface location 20 in accordance with present teachings will be explained. Method 52 may begin with block 54, which may represent a dewatering period. During a dewatering period, a downhole pump 56 located in-line with a casing, pipe or tubing 59, which is a conduit for evacuating water, may be operated and receive water 40 from subsurface compartment 20, which may be a geological subterranean formation, such as porous rock. FIG. 3 depicts how subsurface compartment 20 may be a dome-shaped structure with subterranean pipe 22 entering subsurface compartment 20 at its peak, apex, geometric center or highest location. A dewatering period accomplishes evacuation of water from subsurface compartment 20 and lowers internal pressure of subsurface compartment 20. Pumps 56 operating during a dewatering period may be configured to operate for a predetermined time period or configured to operate based upon a detected pressure within subsurface location 20 and may be configured to stop operating when the pressure within subsurface location 20 equals a predetermined pressure. Multiple dewatering periods are possible with pumps 56 cycling on an off, as will be discussed further later. Dewatering may occur at a rate that is consistent with the amount of water to remove and the time available in which to remove the water. As an example, water may be removed at 5,000 bbls/d (barrels per day); however, water removal rates may be dependent upon subsurface compartment size, also known as field size, and deliverability, or other factors that impact dewatering, such as temperature, downhole pressure, pipe friction, etc.

Figure 3:
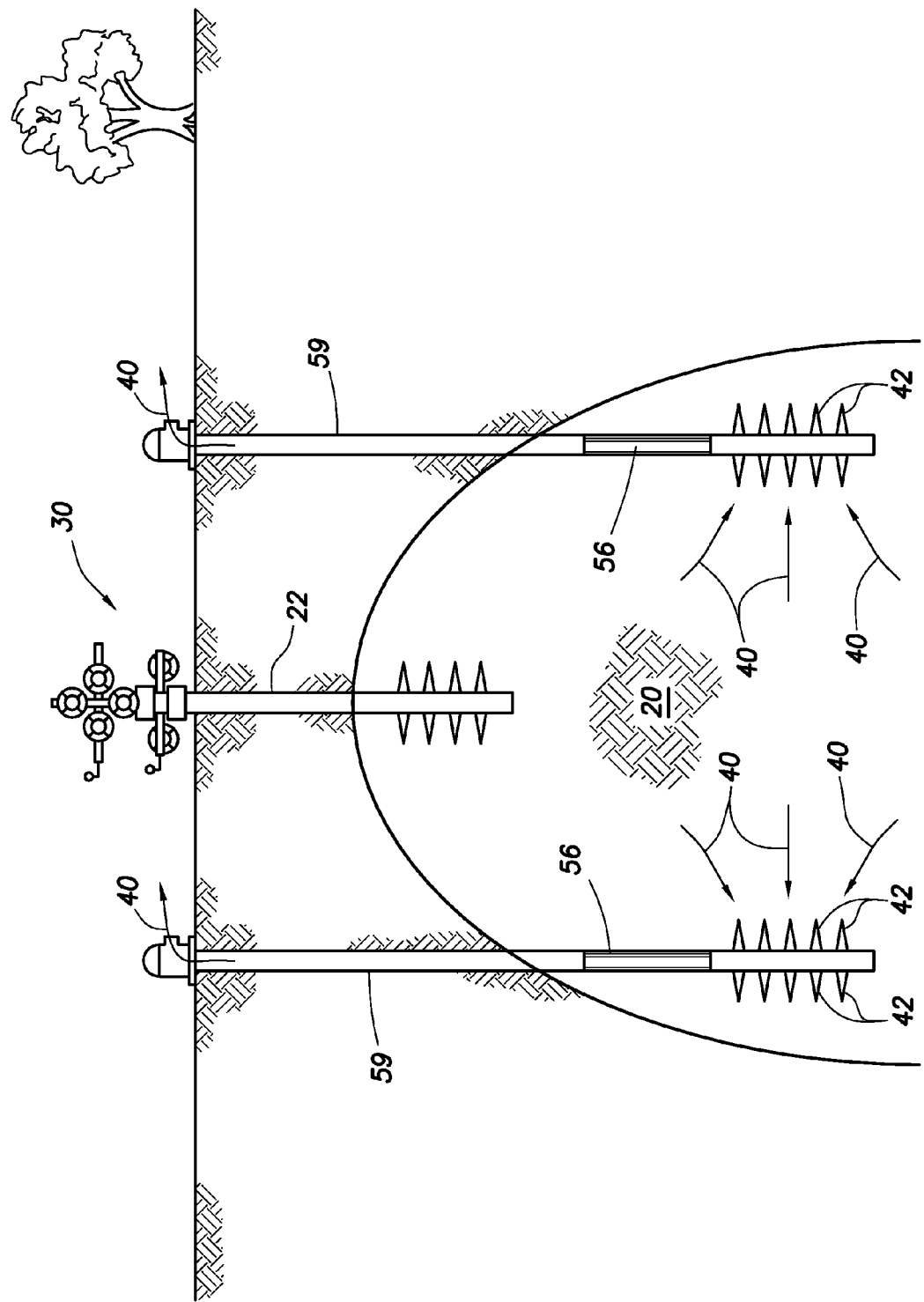
FIG. 3 is a diagram of a dewatering arrangement of a Compressed Air Energy Storage System in accordance with the present disclosure.
Figure 4:
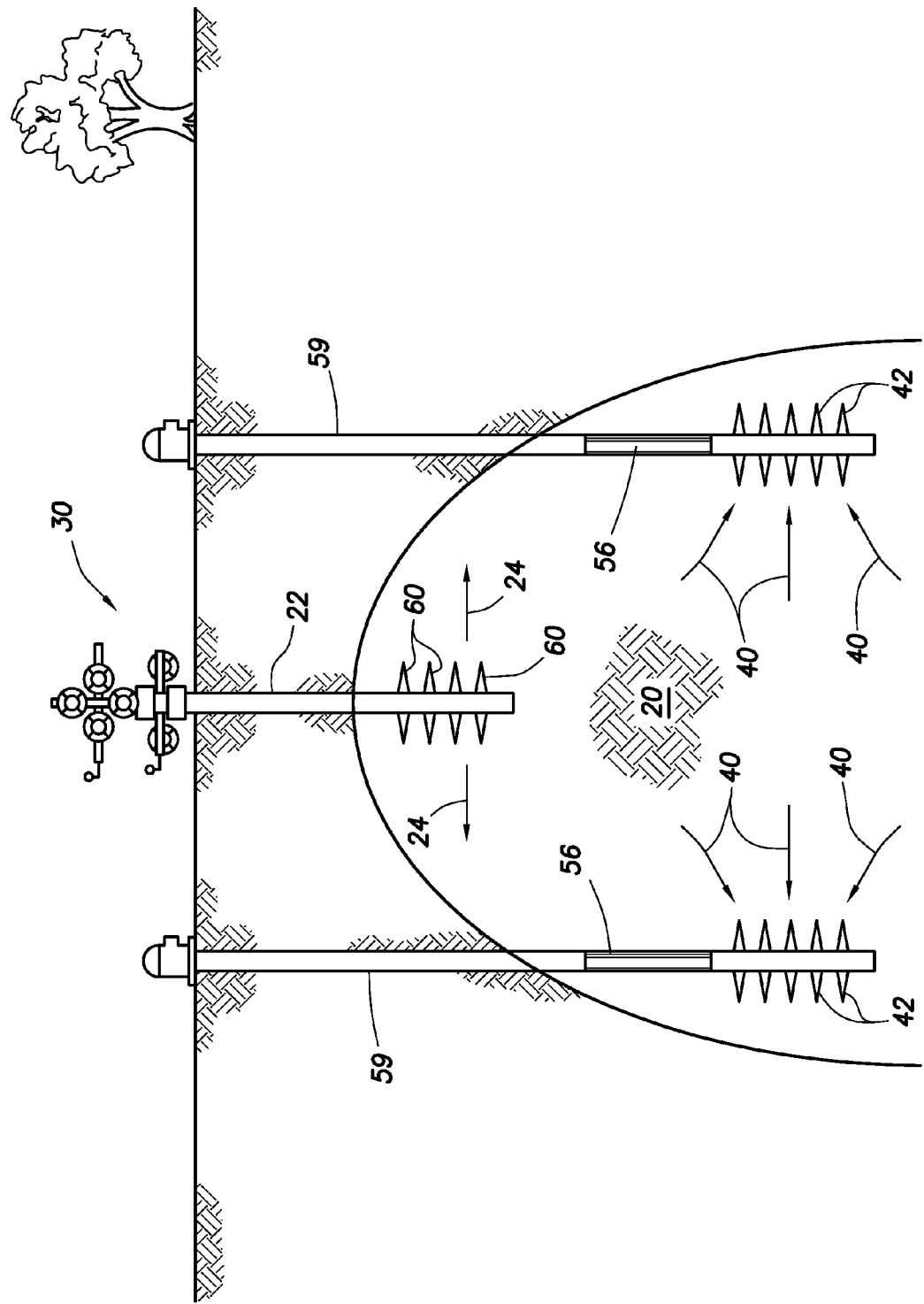
FIG. 4 is a diagram of a simultaneous air injection and dewatering arrangement of a Compressed Air Energy Storage System in accordance with the present disclosure.

Continuing with the method, upon completion of initial dewatering, also known as a dewatering period, indicated by block 54, a subsequent step of simultaneously injecting air and dewatering, indicated with block 58, may be performed. FIG. 4 depicts subsurface compartment 20 undergoing an injection of compressed air from perforations 60 through a wall of subterranean pipe 22 resulting in airflow into subsurface compartment 20. Simultaneously, that is, at the same time that injecting compressed air into subsurface compartment 20 occurs, dewatering as described in conjunction with step 54 of FIG. 2 and depicted in FIG. 3, also occurs. An advantage of simultaneously injecting compressed air and dewatering is that dewatering lowers the average formation pressure within subsurface compartment 20 thereby facilitating receipt of compressed air 24 within subsurface compartment 20 as compressed air 24 is injected into subsurface compartment 20. Because subsurface compartment 20 is not an open air underground cavern, but is a rock formation of porous rock of a single or multiple porosities, a lower pressure within subsurface compartment 20 facilitates receipt and injection of compressed air via subterranean pipe 22. A formation of impermeable material 21, such as impermeable rock, may surround subsurface compartment 20 of porous rock to assist or ensure that compressed air is maintained at an elevated pressure as long as possible within subsurface compartment 20.

Figure 2:
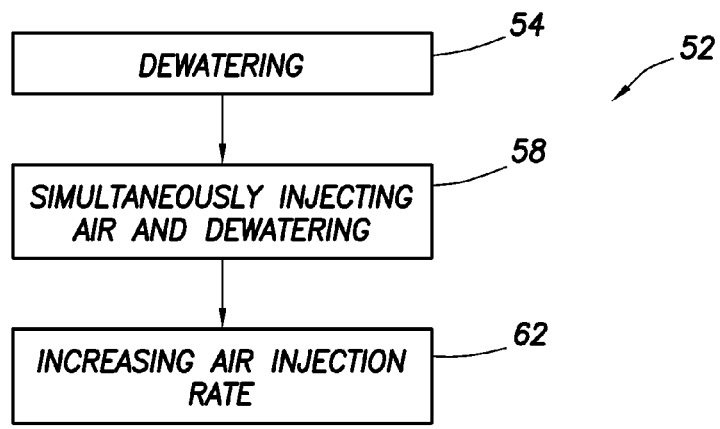
FIG. 2 is a flowchart depicting some of the steps in a method of storing compressed air in a subsurface location in accordance with the present disclosure.

Upon completion of a step of simultaneously injecting air and dewatering, a subsequent step of increasing an air injection rate as part of a method of storing compressed air in a subsurface location is depicted by block 62 of FIG. 2 and in FIG. 5. As part of step 62, compressed air may pass from compressor 18 to and through valve tree 30 until the compressed air passes into subterranean pipe 22 and into subsurface compartment 20. During compression and subsequent injection of compressed air that is deposited and stored in subsurface compartment 20, an air ramp-up compression methodology may be used as part of method 52. In one example of ramping-up air injection, a one hundred seventy (170) day air injection scenario may be employed. Steps (a) through (h) may comprise the air injection scenario and may be: (a) injecting air for 20 days at 2 million standard cubic feet per day (MMscf/d); (b) injecting air for 20 days at 4 (MMscf/d); (c) injecting air for 20 days at 6 (MMscf/d); (d) injecting air for 20 days at 8 (MMscf/d); (e) injecting air for 30 days at 10 (MMscf/d); (f) injecting air for 30 days inject air at 20 (MMscf/d); (g) injecting air for 30 days at 30 (MMscf/d); and (h) injecting air for 30 days at 50 (MMscf/d).

Figure 6:
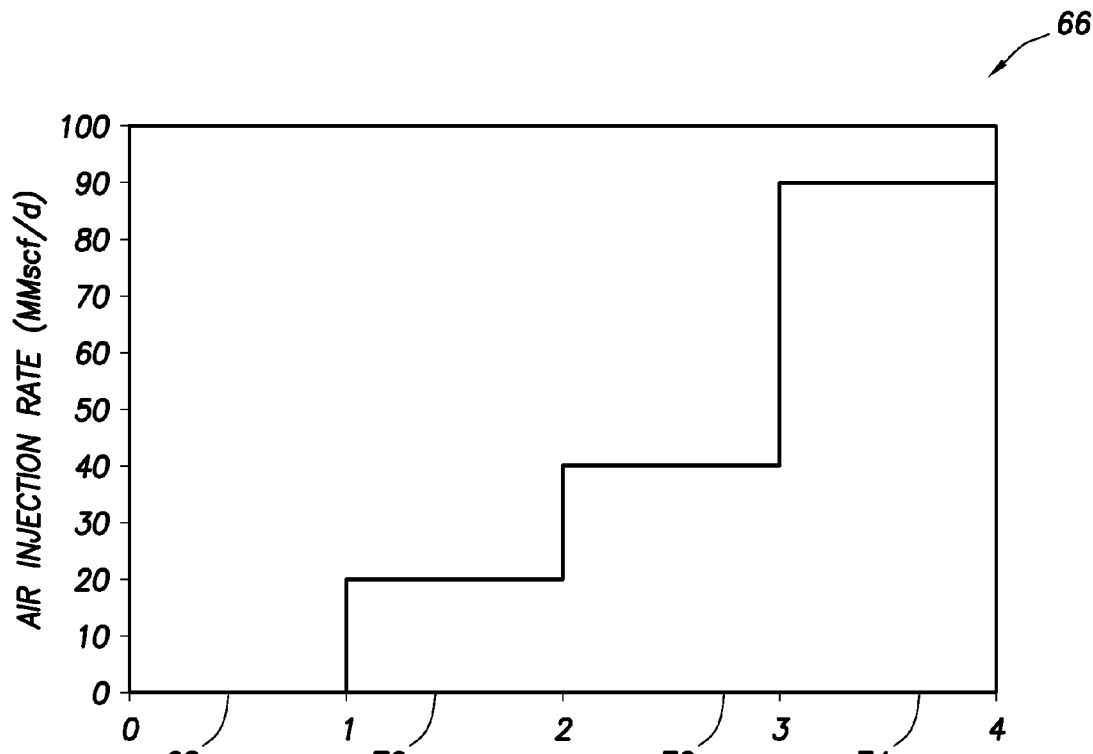
FIG. 6 is a graph depicting an air injection ramp-up scenario in accordance with the present disclosure.

FIG. 6 depicts a graph 66 of air injection rate versus time. The air injection rate at which compressor 18 injects compressed air into subsurface compartment 20 may be millions of standard cubic feet per day (MMscf/d) while time may be hours, days or weeks, for example. Thus, graph 66 depicts a period of no air injection, which may be a dewatering period, and then successive steps of injecting air at increasingly higher rates. As mentioned above, a dewatering period is depicted at time interval 68 between zero (0) and one (1) on the horizontal axis, when no air injection takes place. For the time interval 70 between one (1) and two (2) on the horizontal axis, injecting compressed air is depicted as occurring at approximately 20 MMscf/d for a period of time that is dependent upon formation injectivity and peak and off-peak electrical consumption from the power line from which motor 16 draws electrical energy to drive compressor 18. Formation injectivity may drive or control air injection ramp-up rates and associated time periods at each air injection rate. For the time interval 72 between two (2) and three (3) on the horizontal axis, injecting compressed air is depicted as occurring at approximately 40 MMscf/d for a period of time that is dependent upon formation injectivity and peak and off-peak electrical consumption from the power line from which motor 16 draws electrical energy. For the time interval 74 between three (3) and four (4) on the horizontal axis, injecting compressed air is depicted as occurring at approximately 90 MMscf/d for a period of time that is dependent upon formation injectivity and peak and off-peak electrical consumption from the power line from which motor 16 draws electrical energy. Thus, example time periods for time intervals 70, 72 and 74 may be 12 hours, 24 hours, 36 hours, 48hours, or any interval of time during which electrical energy may be supplied to motor 16 to drive compressor 18 at what is considered to be an economical or off-peak rate.

The actual rate of injecting compressed air and the corresponding time period at which injecting compressed air is accomplished may depend upon the actual subterranean formation within subsurface compartment 20. That is, the actual porosity and permeability of the subterranean formation(s) within subsurface compartment 20 may affect the actual time period for each successive step of injecting air. Air injection rates and time periods may vary widely depending upon the porosity (or permeability), or various porosities (or various permeabilities), of the subterranean formation (e.g. rock). Generally, the less porous a rock formation within a subsurface compartment 20, the lower the initial or first air injection rate of compressed air is for a given air injection ramp-up scenario, such as that depicted in FIG. 2.

Figure 7:
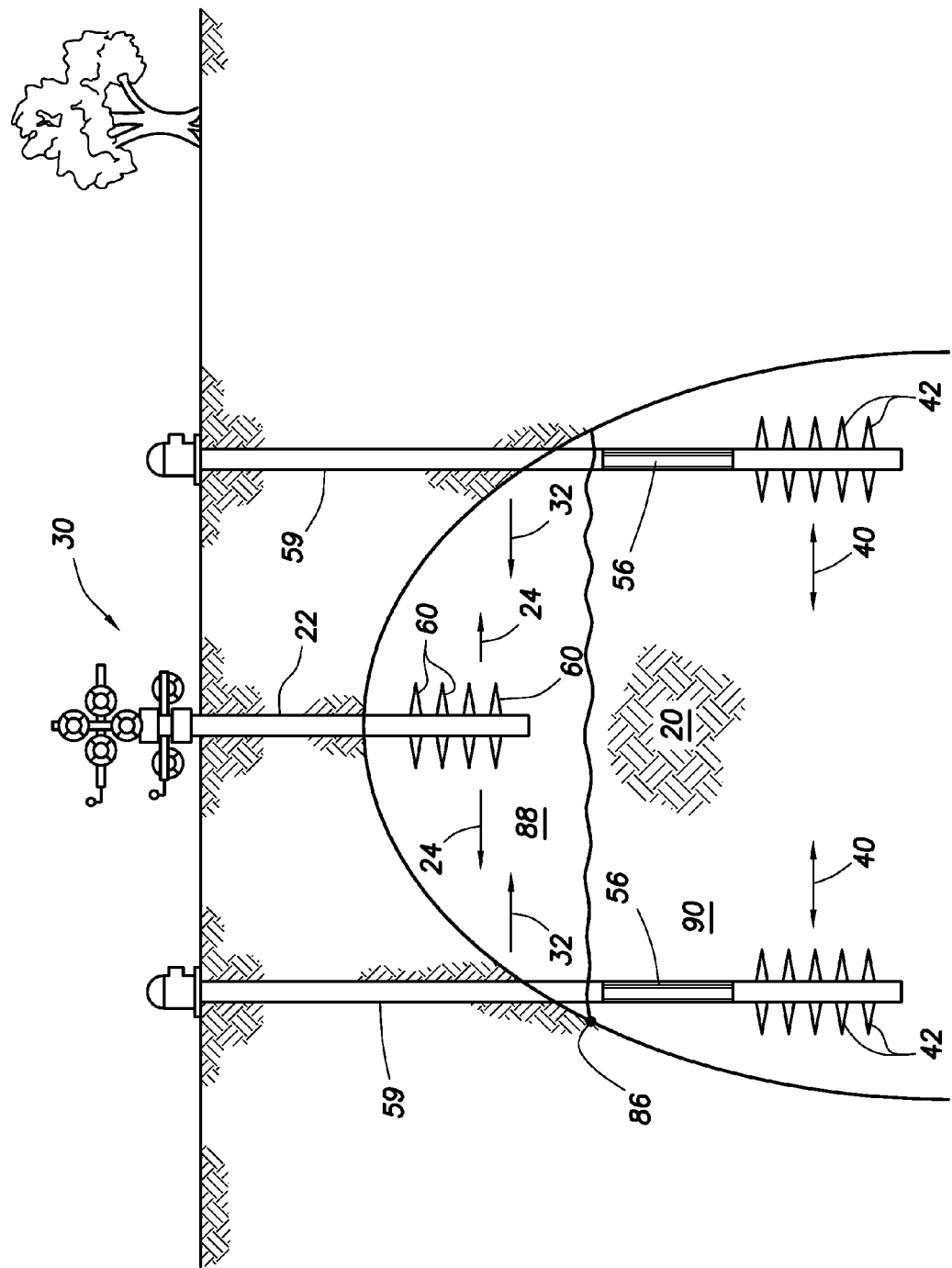
FIG. 7 is a diagram of cyclic air injection and air production of a Compressed Air Energy Storage System in accordance with the present disclosure.

Upon completing a step that involves ramping up air injection, a subsequent step of cycling between air injection and production in a back-and-forth manner may begin as depicted in FIGS. 1 and 7. More specifically, in one example, for every one cubic meter of air injected into subsurface compartment 20, one cubic meter of water may be removed. An advantage of injecting and producing air, and simultaneously producing and injecting water is that a constant pressure is maintained at the phase boundary 86 of subsurface compartment 20. With such an injection/production methodology, a predetermined bottom hole pressure (BHP) may be maintained at the perforations 60 of subterranean pipe 22. That is, with reference to FIG. 7, phase boundary 86 may be a boundary between, or meeting place of, an air or gaseous region 88 and a water or liquid region 90, and by maintaining a constant pressure at phase boundary 86, efficiency and wear on equipment of CAES system 10 may be kept at a minimum. Pressure may be maintained using known pressure measuring devices at a chosen location within subsurface compartment 20, such as at downhole pump 56, using a known pressure measuring device and technique.

In one example, a cyclic step of injecting air and producing air may include injecting air into subsurface compartment 20 at 50 MMscf/d for a period of 24 hours and then immediately after or subsequently to such 24 hour period of injecting air, producing air from subsurface compartment 20 at 50 MMscf/d for a period of 24 hours. Maintaining reference to FIGS. 1 and 7, during a time period of injecting compressed air, air compressed by compressor 18 may be injected through valving 30, through subterranean pipe 22, from perforations 60 in subterranean pipe 22 and into subterranean compartment 20. As an example, air injection into subsurface compartment 20 is represented by arrow 24 and may occur for a period of hours, such as during, or only during, a period of off-peak energy consumption. A time period of off-peak consumer consumption of electrical energy may be a time period during which energy consumption is at its lowest for a 24 hour period at a given geographic location, such as for example, a time period from 9 PM to a period of 9 AM for a given day of the week at a given geographic location. Depending upon locale and consumer consumption characteristics of electrical energy, off-peak consumption time periods may vary.

During a period of producing electricity using CAES system 10, valving 30 may be adjusted to only permit compressed air to be released from subsurface compartment 20 such that air flows through perforations 60, into subterranean pipe 22, through valving 30 and to turbine 44, which rotates by expanding compressed air 32 that is flowing from subterranean formation 20. Expanding air being released from subsurface compartment 20 may pass through perforations 60 in subterranean pipe 22 as depicted by arrow 32 and may occur for a period of hours, such as during or only during a period of peak electrical energy consumption for a given locale. A time period of peak consumer consumption of electrical energy may be a time period during which energy consumption is at its highest for a 24 hour period, such as for example, a time period from 9 AM to a period of 9 PM for a given day of the week for a given geographic location. Thus, electrical energy is produced by generator 46 during air production and transferred back to power line 12. Depending upon locale and consumer consumption characteristics of electrical energy, peak consumption time periods may vary.

Figure 8:
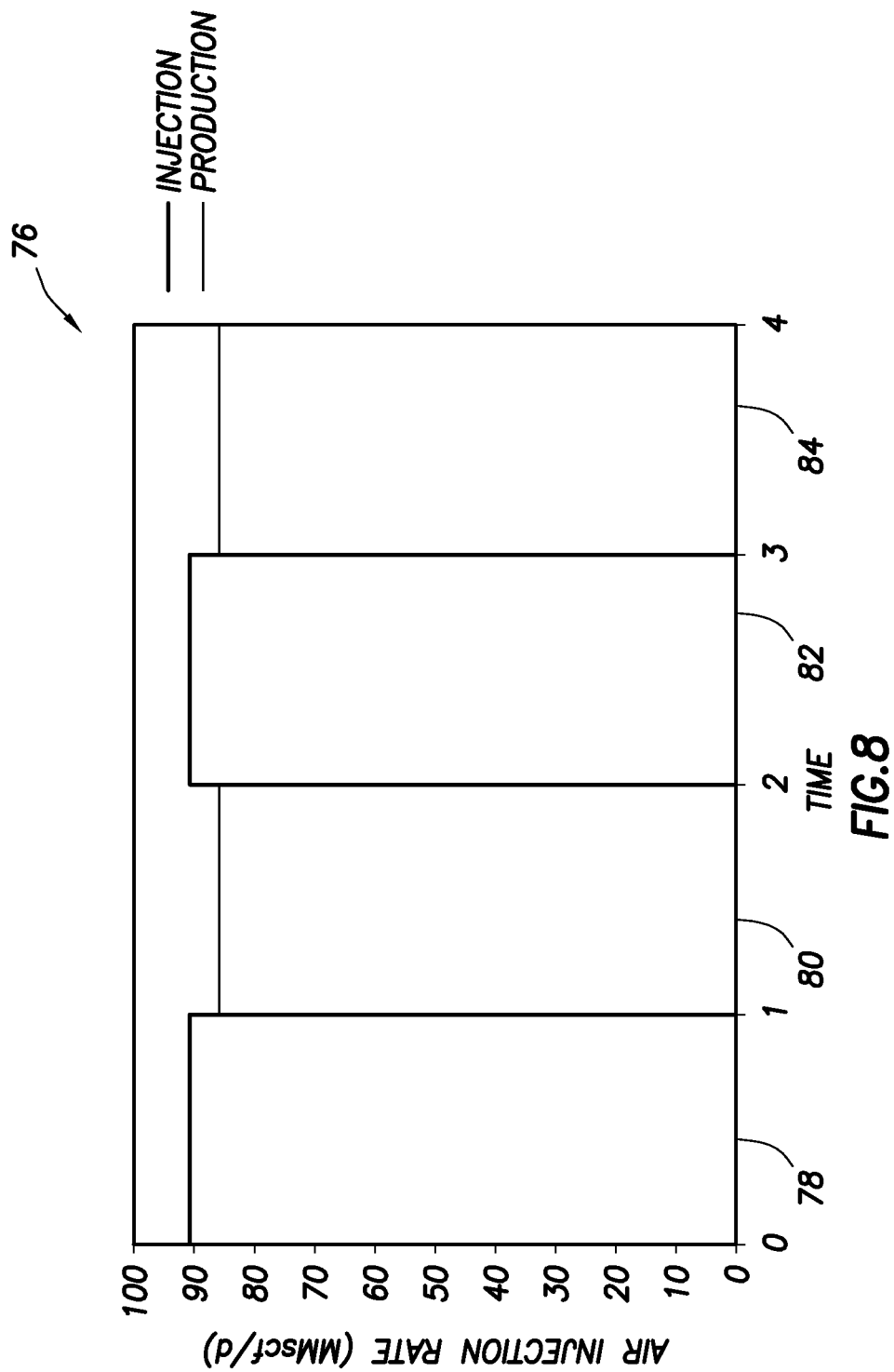
FIG. 8 is a graph depicting an air injection and air production scenario in accordance with the present disclosure.

FIG. 8 depicts a graph 76 of air injection rate versus time, and more specifically, a graph of a series of alternating time intervals during which cyclic periods of an injection period 78, production period 80, injection period 82, and production period 84, occur. In the scenario depicted by graph 76 of FIG. 8, a time interval 78 from time interval zero (0) to time interval one (1) represents a time period during which injecting compressed air into subsurface compartment 20 occurs, a time interval 80 from time interval one (1) to time interval two (2) represents a time period during which producing compressed air from subsurface compartment 20 occurs, a time interval 82 from time interval two (2) to time interval three (3) represents a time period during which injecting compressed air into subsurface compartment 20 occurs, and a time interval 84 from time interval three (3) to time interval four (4) represents a time period during which producing compressed air from subsurface compartment 20 occurs. Because of inefficiencies in the cyclic air-injection/air-production process, air may not be able to be produced at the same rate as it is injected. That is, if air is injected at a prescribed rate, production of that air will be at a slightly lower rate due to friction losses and trapped air within the formation, for example. In the air injection scenario depicted in FIG. 8, injection of compressed air at injection period 78 occurs subsequent to an initial air injection ramp-up period and as part of an on-going, cyclic or continuous air-injection/air-production process.

In practicing the present disclosure, one or more injection well/producer wells 64 may be utilized and one or more dewatering wells 34 may be utilized. Injection/producer well 64 may pierce subsurface compartment 20 at a peak, such as the highest peak, of subsurface compartment 20. Perforations 42 of dewatering well(s) 34 may be located at a base or lowest portion 62 of subsurface compartment 20. Moreover, as viewed from above earthen surface 36, injection/producer well 64 may be located at or near a geometric center of a peak of subsurface compartment 20 while dewatering well(s) 34 may be evenly spaced about and located around a geometric periphery of a base or lowest portion of subsurface compartment 20.

Regarding implementation of the above-described method, those skilled in the art will understand that initial formation pressures of subsurface compartments, such as subsurface compartment 20, may vary with depth. In estimating an initial pressure of a subterranean formation, which normally and naturally exists under pressure, a formation depth of the subterranean formation below an earthen surface may be divided by two (2) to estimate an initial pressure. As an example, a subsurface formation that is 4,000 feet deep, may normally exhibit a pressure of around 2,000 pounds per square inch (PSI). That is, the subterranean formation of a subsurface compartment 20 may normally be pressurized without any prior human intervention. The exact equipment used in implementation of the method described above may dictate what formation depth and formation pressure is an acceptable starting pressure. Equipment such as compressor 18, turbine 44, and all associated equipment must be capable of withstanding all pressurized air and/or water of the above-described method.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for storing compressed air in a porous subterranean formation, the process comprising:
without injecting air into the porous subterranean formation, pumping water from the porous subterranean formation having a single porosity or a variety of porosities to an earthen surface and simultaneously lowering an internal pressure of the porous subterranean formation to a first predetermined pressure;
simultaneously injecting air into and pumping water from the porous subterranean. formation;
ramping-up air injection into the porous subterranean formation; and
creating a volume of compressed air at the peak of the porous subterranean formation.

2. The process according to claim 1, the process further comprising:
cycling between injecting air into the porous subterranean formation and producing air from the porous subterranean formation.

3. The process according to claim 1, wherein ramping-up air injection further comprises, in the following order: (a) injecting air for 20 days at 2 MMscf/d, (b) injecting air for 20 days at 4 MMscf/d, (c) injecting air for 20 days at 6 MMscf/d, (d) injecting air for 20 days at 8 MMscf/d, (e) injecting air for 30 days at 10 MMscf/d, (f) injecting air for 30 days injecting air at 20 MMscf/d, (g) injecting air for 30 days at 30 MMscf/d, and (h) injecting air for 30 days at 50 MMscf/d.

4. The process according to claim 1, wherein ramping-up air injection further comprises successively increasing air injection rates without intervening periods of non-air injection.

5. The process according to claim 1, wherein ramping-up air injection further comprises successively increasing air injection rates without intervening periods of decreasing air injection.

6. The process according to claim 1, wherein injecting air from the porous subterranean formation further comprises injecting air only the peak of the porous subterranean formation.

7. The process according to claim 1, wherein pumping water from the porous subterranean formation further comprises pumping water from a location of the porous subterranean formation that is farthest from the earthen surface.

8. The process according to claim 1, wherein pumping water from the porous subterranean formation to the earthen surface further comprises pumping water from porous rock of the porous subterranean formation.

9. A process for storing compressed air in a porous subterranean formation, in the following order, comprising:
pumping water from the porous subterranean formation having a single porosity or a variety of porosities to an earthen surface;
lowering an internal pressure of the porous subterranean formation to a first predetermined pressure without injecting air into the porous subterranean formation;
simultaneously injecting air into and pumping water from the porous subterranean formation;
measuring the subterranean pressure of the porous subterranean formation;
upon the subterranean pressure reaching the first predetermined pressure, ramping-up a rate of air injection into the porous subterranean formation; and
creating a volume of compressed air at the peak of the porous subterranean formation.

10. The process according to claim 9, the process further comprising:
cycling between injecting air into the porous subterranean formation and producing air from the porous subterranean formation.

11. The process according to claim 10, wherein cyclically injecting air into the porous subterranean formation and producing air from the porous subterranean formation are performed serially without an intervening step.

12. The process according to claim 9, wherein ramping-up a rate of air injection further comprises, in the following order: (a) injecting air for 20 days at 2 MMscf/d, .(b) injecting air for 20 days at 4 MMscf/d, (c) injecting air for 20 days at 6 MMscf/d, (d) injecting air for 20 days at 8 MMscf/d, (e) injecting air for 30 days at 10 MMscf/d; (f) injecting air for 30 days injecting air at 20 MMscf/d, (g) injecting air for 30 days at 30 MMscf/d, and (h) injecting air for 30 days at 50 MMscf/d.

13. The process according to claim 9, wherein ramping-up a rate of air injection further comprises successively increasing a rate of air injection without any intervening period of decreasing a rate of air injection.

14. The process according to claim 10, wherein injecting air into the porous subterranean formation further comprises injecting air at the peak of the porous subterranean formation.

15. The process according to claim 9, wherein pumping water from the porous subterranean formation further comprises pumping water from an area of the porous subterranean formation that is farthest from the earthen surface.

16. The process according to claim 9, wherein ramping-up a rate of air injection further comprises successively increasing a rate of air injection into porous rock.

17. A process for storing compressed air in a porous subterranean formation, having steps in the following order, comprising:
   placing an air injection tube at a peak of the porous subterranean formation having a single porosity or a variety of porosities;
   without injecting air into the porous subterranean formation, lowering an internal pressure of the porous subterranean formation to a first predetermined pressure by pumping water from the porous subterranean formation to an earthen surface;
   simultaneously injecting air into the porous subterranean formation via the air injection tube and pumping water from the porous subterranean formation;
   measuring the internal pressure of the porous subterranean formation;
   increasing an air injection rate into the porous subterranean formation upon the internal pressure reaching the first predetermined pressure; and
   creating and maintaining a volume of compressed air at the peak of the porous subterranean formation by cycling between injecting air into the porous subterranean formation producing air from the porous subterranean formation.

18. The process according to claim 17, wherein increasing an air injection rate into the porous subterranean formation upon the internal pressure reaching the first predetermined pressure further comprises increasing an air injection rate into porous rock.

19. The process according to claim 18, wherein increasing an air injection rate further comprises multiple increases in the rate of air injection without any intervening period of non-air injection.

* * * * *